United States Patent
Okada et al.

(10) Patent No.: US 10,879,572 B2
(45) Date of Patent: Dec. 29, 2020

(54) POWER SUPPLY DEVICE AND VEHICLE PROVIDED WITH SAME

(71) Applicant: SANYO Electric Co., Ltd., Osaka (JP)

(72) Inventors: Wataru Okada, Hyogo (JP); Yoshiaki Ueta, Shizuoka (JP); Shuichi Sugawara, Miyagi (JP); Yoshihiro Shiotsu, Osaka (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 146 days.

(21) Appl. No.: 15/540,376

(22) PCT Filed: Nov. 6, 2015

(86) PCT No.: PCT/JP2015/005566
§ 371 (c)(1),
(2) Date: Jun. 28, 2017

(87) PCT Pub. No.: WO2016/157263
PCT Pub. Date: Jun. 10, 2016

(65) Prior Publication Data
US 2017/0365897 A1   Dec. 21, 2017

(30) Foreign Application Priority Data
Mar. 31, 2015  (JP) .................. 2015-073506

(51) Int. Cl.
*H01M 10/6563* (2014.01)
*H01M 10/625* (2014.01)
*H01M 10/613* (2014.01)
*H01M 2/10* (2006.01)
*H01M 10/667* (2014.01)
*H01M 10/42* (2006.01)
*B60L 50/64* (2019.01)
*H01M 10/647* (2014.01)
*H01M 10/6557* (2014.01)

(52) U.S. Cl.
CPC ......... *H01M 10/6563* (2015.04); *B60L 50/64* (2019.02); *H01M 2/10* (2013.01);
(Continued)

(58) Field of Classification Search
CPC .... H01M 2/0245; H01M 2/10; H01M 2/1077; H01M 2/1094; H01M 10/425;
(Continued)

(56) References Cited

U.S. PATENT DOCUMENTS 5,392,873 A     2/1995 Masuyama et al.
2010/0136420 A1*  6/2010 Shin .................... H01M 2/1077
                                                    429/178
(Continued)

FOREIGN PATENT DOCUMENTS

CN        102216100        10/2011
JP        5-193366         8/1993
(Continued)

OTHER PUBLICATIONS

Machine translation for JP 05-193366 A. (Year: 2019).*
(Continued)

*Primary Examiner* — Robert S Carrico
(74) *Attorney, Agent, or Firm* — Wenderoth, Lind & Ponack, L.L.P.

(57) ABSTRACT

In order to provide a power supply device having a high rigidity and a light weight, power supply device includes: one or more cell stacked bodies each formed by stacking secondary battery cells; a circuit board including a control circuit electrically connected to the cell stacked bodies; resin-made battery case for storing the cell stacked bodies and circuit board; metal-made lower frame for covering the bottom surface of battery case; and metal-made upper frame for covering the upper surface of battery case. Battery case has a waterproof structure. Battery case is grasped by connecting upper frame to lower frame.

14 Claims, 12 Drawing Sheets

(52) U.S. Cl.
CPC ....... *H01M 2/1077* (2013.01); *H01M 2/1094* (2013.01); *H01M 10/425* (2013.01); *H01M 10/4257* (2013.01); *H01M 10/613* (2015.04); *H01M 10/625* (2015.04); *H01M 10/647* (2015.04); *H01M 10/6557* (2015.04); *H01M 10/667* (2015.04); *H01M 2220/20* (2013.01)

(58) Field of Classification Search
CPC ............. H01M 10/613; H01M 10/625; H01M 10/647; H01M 10/6563; H01M 10/667
See application file for complete search history.

(56) References Cited

U.S. PATENT DOCUMENTS

| | | | |
|---|---|---|---|
| 2011/0222240 A1 | 9/2011 | Kawata et al. | |
| 2012/0164500 A1 | 6/2012 | Loo et al. | |
| 2014/0124278 A1* | 5/2014 | Takamura | ............... B60L 1/003 |
| | | | 180/65.51 |
| 2016/0093932 A1* | 3/2016 | Obasih | ............. H01M 10/0525 |
| | | | 429/120 |

FOREIGN PATENT DOCUMENTS

| | | | | | |
|---|---|---|---|---|---|
| JP | | 05193366 | A | * 8/1993 | .......... H01M 2/1083 |
| JP | | 2001167803 | A | * 6/2001 | |
| JP | | 2011049014 | A | * 3/2011 | |
| JP | | 2011-146289 | | 7/2011 | |
| JP | | 2015-008161 | | 1/2015 | |

OTHER PUBLICATIONS

Machine translation for JP 2011-049014 A. (Year: 2019).*
International Search Report of PCT application No. PCT/JP2015/005566 dated Feb. 9, 2016.
English Translation of Chinese Search Report dated Sep. 30, 2020 for the related Chinese Patent Application No. 201580076020.X.

* cited by examiner

POWER SUPPLY DEVICE AND VEHICLE PROVIDED WITH SAME

This application is a U.S. national stage application of the PCT international application PCT/JP2015/005566 filed on Nov. 6, 2015, which claims the benefit of foreign priority of Japanese patent application No. 2015-073506 filed on Mar. 31, 2015, the contents all of which are incorporated herein by reference.

TECHNICAL FIELD

The present invention relates to a power supply device and a vehicle equipped with the power supply device, for example relates to a power supply device of a motor that is mounted in an electric vehicle such as a hybrid car, an electric car, or an electric motorcycle, and makes the vehicle travel.

BACKGROUND ART

A power supply device formed by interconnecting a plurality of secondary battery cells in series or in parallel is used for a vehicle. Such a power supply device mainly employs a structure where a module such as secondary battery cells and a high-voltage component such as a circuit board are stored and fixed in a metal frame or a metal case. Especially, a power supply device for vehicles requires strength enough to withstand a vibration or impact while holding the module and high-voltage component as heavy objects. In a situation requiring such a high rigidity, the frame or case is typically made of a metal member.

When a metal frame or a metal case component is used, however, the weight is heavy, and a disadvantage is caused in terms of fuel consumption and travelling performance. Furthermore, a metal case cannot take a complex shape and it is difficult to improve the waterproof property.

While, it is considered that the case is made of a resin. However, the weight of the resin case can be reduced, but the strength becomes low and a sufficient resistance cannot be obtained, disadvantageously.

CITATION LIST

Patent Literature

PTL 1: Unexamined Japanese Patent Publication No. 2015-8161

SUMMARY OF THE INVENTION

The present invention addresses these disadvantages of the conventional power supply devices. One of the objectives of the present invention is to provide a power supply device that has a high resistance and a light weight.

A first power supply device of the present invention includes: one or more cell stacked bodies each formed by stacking secondary battery cells; a circuit board including a control circuit electrically connected to the cell stacked bodies; a resin-made battery case for storing the cell stacked bodies and the circuit board; a metal-made lower frame for covering the bottom surface of the battery case; and a metal-made upper frame for covering the upper surface of the battery case. The battery case has a waterproof structure. The battery case can be grasped by connecting the upper frame to the lower frame. In this configuration, the battery case is made of a resin that facilitates the molding even in a relatively complicated shape, and hence the waterproof structure is easily achieved. The upper and lower surfaces of the battery case are covered with the metal-made frames, and hence the strength is secured. By covering the periphery of the battery case with the metal-made frames, the heat dissipation can be improved, and the shielding effect of the metal plates can improve the immunity to electromagnetic noise (EMC).

In a second power supply device, the upper frame includes a first frame and a second frame, the first frame and second frame are disposed separately from each other, and an exposed region through which a part of the battery case is exposed can be disposed between the first frame and second frame. In this configuration, by separating the first frame from the second frame, the heat dissipation from these frames can be improved. Especially, when a member serving as a heat source is disposed in each frame, the heat generation is confined within one frame side, and the probability that the heat affects the other members can be reduced.

In a third power supply device, the outer shape of the power supply device is set as a rectangular shape extended in one direction in the plan view, and the exposed region can be disposed in the center in the longitudinal direction.

A fourth power supply device further includes a direct current (DC)/DC converter for converting the output of the cell stacked body into a predetermined voltage, and the DC/DC converter can be disposed in a region covered with the first frame in the battery case. In this configuration, the DC/DC converter can be built in the battery case to make the battery case compact, the DC/DC converter can be protected by the first frame, and the heat dissipation performance for dissipating the heat generated by the DC/DC converter out of the power supply device via the first frame can be improved. Especially, the cooling structure of the cell stacked body can be also used for cooling the DC/DC converter, and the structure can be further made compact.

In a fifth power supply device, the circuit board can be disposed in the region covered with the second frame in the battery case. In this configuration, the circuit board is blocked by the metal-made second frame, and the heat dissipation can be improved via the second frame.

In a sixth power supply device, the battery case includes an intake port for taking a cooling gas into the battery case and an exhaust port for exhausting the cooling gas after heat exchange. At least one of the intake port and exhaust port can be disposed in the exposed region. In this configuration, the battery case is covered with the metal frames, an opening is formed in the region having no first frame and no second frame, and the flow of the cooling gas between the inside and outside of the battery case can be provided.

In a seventh power supply device, an opening projecting from the surface of the battery case can be formed in the at least one of the intake port and exhaust port that is disposed in the exposed region. In this configuration, by omitting a metal-made frame in the part having the opening, the opening can be formed in a large size, and the flow rate of the cooling gas passing through the opening can be increased. Thus, the cooling performance can be improved.

In an eighth power supply device, the other of the intake port and exhaust port can be disposed in a side surface of the battery case.

In a ninth power supply device, the exhaust port can be disposed in the exposed region.

In a tenth power supply device, the lower frame and upper frame have a fixing piece for fixing the power supply device.

In an eleventh power supply device, the battery case is divided into an upper case and lower case, and an elastic member can be disposed on a joint surface between the upper case and lower case. In this configuration, a waterproof structure of the resin-made battery case can be easily created.

In a twelfth power supply device, one or more recesses can be formed in the surface of the battery case in the exposed region. In this configuration, the recesses can be used for positioning and fixing.

In a thirteenth power supply device, the recesses can include, in the exposed region of the battery case, a first recess disposed on the upper surface side of the battery case and a second recess disposed on the lower surface side of the battery case. In this configuration, the recesses are disposed on the upper and lower surfaces of the battery case, so that the battery case is positioned from both sides and a stable fixing can be achieved.

In a fourteenth power supply device, the battery case stores a plurality of cell stacked bodies, the cell stacked bodies are arranged in the longitudinal direction of the battery case, and the recesses can be formed between the cell stacked bodies arranged in the longitudinal direction of the battery case.

In a fifteenth power supply device, the lower frame can be formed by welding a plurality of metal plates to each other.

Furthermore, a vehicle in accordance with a sixteenth aspect can include the above-mentioned power supply device.

DESCRIPTION OF EMBODIMENT(S)

Figure 1:
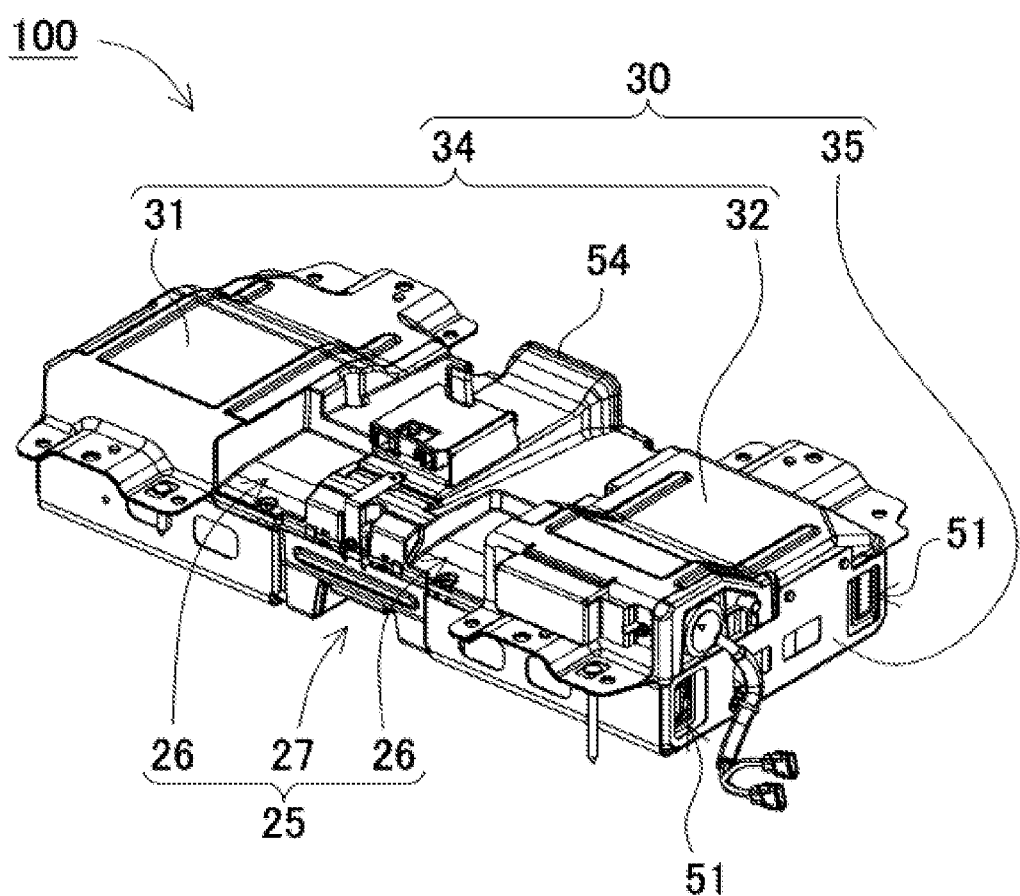
FIG. 1 is a perspective view from the forward-obliquely upward side of a power supply device in accordance with a first exemplary embodiment of the present invention.

FIG. 1 to FIG. 9 show power supply device 100 in accordance with a first exemplary embodiment of the present invention. Power supply device 100 shown in these drawings shows an example of an on-vehicle power supply device. Specifically, power supply device 100 is mounted mainly in an electric vehicle such as a hybrid car or an electric car, and is used as a power source that supplies power to a travel motor of the vehicle and makes the vehicle travel. The power supply device of the present invention can be also used for an electric vehicle other than the hybrid car and electric car, and can be also used for an application requiring a high power, other than the electric vehicle.

(Power Supply Device 100)

As shown in FIG. 1 to FIG. 6, the appearance of power supply device 100 has a substantially box shape extended in one direction. As shown in the exploded perspective view of FIG. 6, power supply device 100 is configured so that the upside and downside of resin-made battery case 20 are covered with metal-made frame 30. Metal frame 30 includes: metal-made lower frame 35 for covering the bottom surface of battery case 20; and metal-made upper frame 34 for covering the upper surface of battery case 20. While, as shown in the exploded perspective views of FIG. 7, FIG. 8, and FIG. 9, resin-made battery case 20 stores cell assembly 10 inside it. Cell assembly 10 is formed of cell stacked bodies 11 produced by stacking secondary battery cells 1, circuit board 42, and the like.

Thus, battery case 20 is made of a resin, so that battery case 20 can be molded in various shapes and a waterproof structure can be easily achieved. The upper and lower surfaces are covered with metal frame 30, so that the mechanical strength is secured. The heat dissipation is improved by covering the periphery of battery case 20 with metal frame 30, and the shielding effect by the metal plates can improve the noise immunity of an electronic circuit in the battery case.

(Metal Frame 30)

The upper surface and lower surface of battery case 20 are grasped by upper frame 34 and lower frame 35. Therefore, upper frame 34 and lower frame 35 are interconnected by tightening screws into fixing pieces 36 disposed on their side surfaces. Each of upper frame 34 and lower frame 35 is formed by folding a metal plate. In order to improve the rigidity, a partially folded uneven part or rib may be formed. Examples of this metal plate include a high tensile strength steel having a high rigidity and high thermal conductivity, a general steel, a stainless steel, an aluminum alloy, a magnesium alloy, and a combination of them. Lower frame 35 is formed by welding a plurality of metal plates to each other. Lower frame 35 may be formed not only by welding a plurality of metal plates to each other, but also by integrally molding the metal plates by press work.

Figure 6:
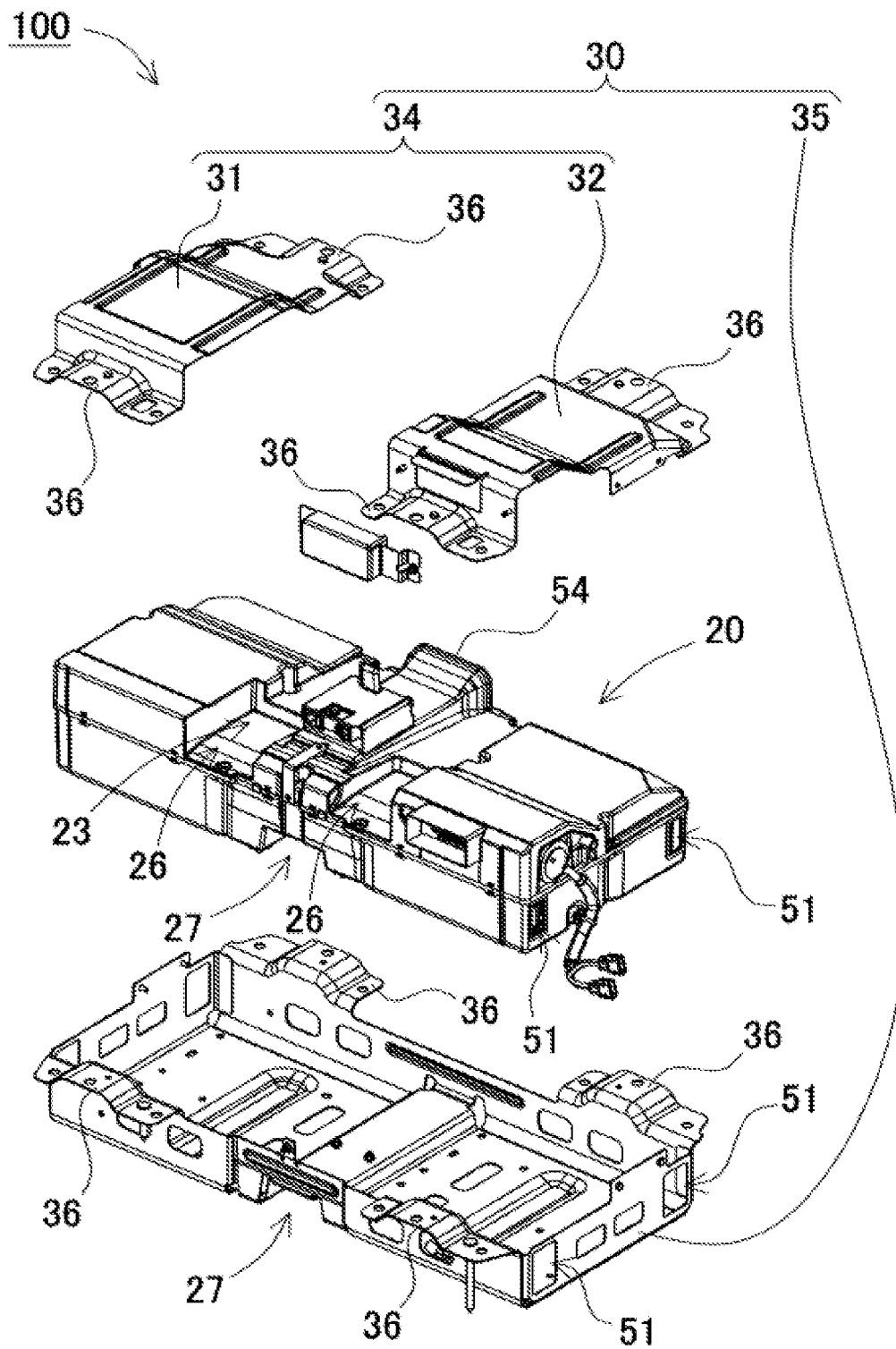
FIG. 6 is an exploded perspective view when a metal frame is removed from the power supply device of FIG. 1.
Figure 7:
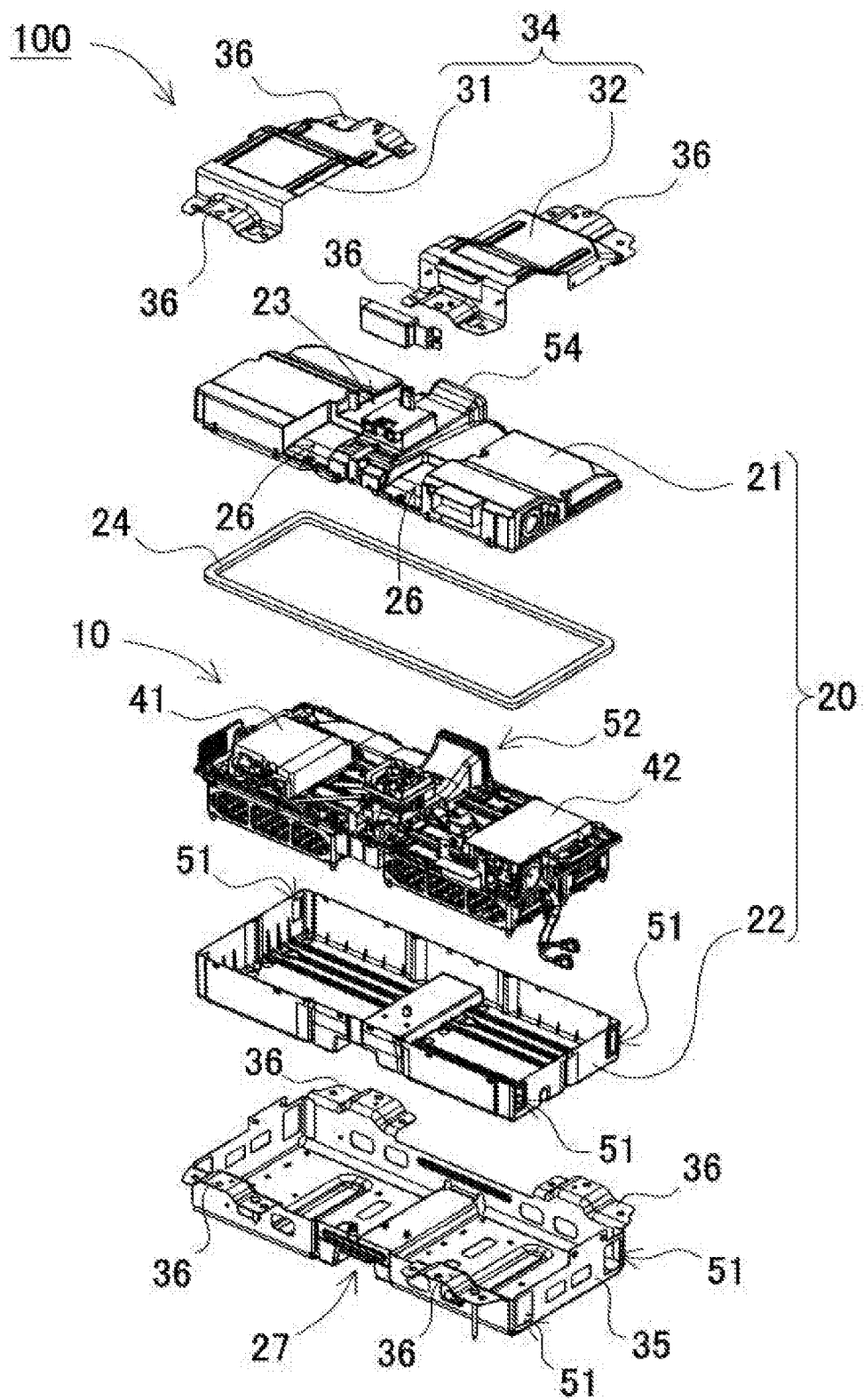
FIG. 7 is an exploded perspective view showing the state where a battery case of FIG. 6 is disassembled.

Metal frame 30 does not cover the whole periphery of battery case 20, preferably covers only a necessary part. In the configuration of FIG. 6 and FIG. 7, lower frame 35 of metal frame 30 has a bottomed box shape having an open upper surface, and upper frame 34 has a shape allowing a part of the upper surface of battery case 20 to be exposed. The side surfaces of battery case 20 may be opened without being covered with metal frame 30. Thus, by partially covering battery case 20 with metal frame 30, the metal plate is disposed in a part requiring a high strength. While, by omitting the metal plate in a part that does not require a high strength, the surface area requiring the metal plate can be reduced to decrease the weight and cost. Furthermore, the exposed region having no metal plate can be thinned by the thickness corresponding to the thickness of the metal plate.

In the example shown by FIG. 6 and FIG. 7, upper frame 34 is divided into first frame 31 and second frame 32, and first frame 31 and second frame 32 are disposed separately in spaced relationship with each other. Thus, exposed region 23 through which a part of battery case 20 is exposed is formed between first frame 31 and second frame 32. In exposed region 23, the thickness is reduced. Especially, as shown in the perspective view of FIG. 10, in a configuration where power supply device 100 is disposed, extended on the lower surfaces of two adjacent seats ST of a vehicle, first frame 31 and second frame 32 are disposed on the portions corresponding to the lower surfaces of seats ST that require a high strength. A part between these portions does not have a metal plate, spaces for disposing necessary members can be secured, and the in-car space can be efficiently used.

By at least partially covering the surface of battery case 20 with metal frame 30, the effect of improving the heat dissipation from battery case 20 can be produced. Especially, when the battery case is made of a resin, the thermal conductivity is relatively low. Then, metal frame 30 having a high thermal conductivity is disposed on the surface of resin-made battery case 20, and is made to serve as a heat dissipation plate. Especially, by disposing heat generating members directly under first frame 31 and second frame 32, the heat generated in battery case 20 can be efficiently dissipated via metal frame 30, the mechanical strength can be increased, and the heat dissipation can be improved. Thus, the reliability can be further improved.

By separating first frame 31 and second frame 32 from each other, advantageously, these metal frames can be thermally separated from each other. For example, when a plurality of members serving as heat sources exist in battery case 20, the influence of the heat generated from each heat source on the other members must be reduced. When a first heat source and second heat source exist as the heat sources in battery case 20, these are disposed separately from each other to secure the heat dissipation from each heat source. In addition, first frame 31 and second frame 32 are disposed at the positions of the first heat source and second heat source, respectively, the heat dissipated from each heat source is transferred by each metal frame. Thus, the heat dissipated from each heat source is transferred more to the metal frame 30 side via battery case 20 than to the inside of battery case 20. Thus, the components in battery case 20 can be protected from heat generation. Especially, when the amount of heat generation by the first heat source is different from that by the second heat source—for example, when the amount of heat generation by the first heat source is larger—the following problem is considered:

the heat generated by the first heat source is also transferred to the second heat source side to affect it, or inhibits the heat dissipation from the second heat source.

Therefore, by thermally separating them from each other, the heat dissipation from the member having a larger amount of heat generation is individually performed, and hence the heat dissipation can be improved. In the example shown by FIG. 6, FIG. 7, and the like, first frame 31 and second frame 32 are disposed on the surface of battery case 20 separately from each other in the longitudinal direction. Thus, exposed region 23 through which a part of battery case 20 is exposed is formed between first frame 31 and second frame 32, and hence first frame 31 is thermally separated from second frame 32. Furthermore, the first heat source and second heat source are disposed on the lower surfaces of first frame 31 and second frame 32, respectively, so that the heat dissipated from each heat source is transferred via each frame and the influence of the interference between mutual heat generations is reduced.

First frame 31 and second frame 32 are disposed at the opposite ends in the longitudinal direction of battery case 20, and exposed region 23 is disposed in the center in the longitudinal direction. Thus, the first heat source and second heat source are disposed in limited-size battery case 20 separately from each other as much as possible, and hence can be effectively and thermally separated from each other.

(Fixing Piece 36)

Metal frame 30 includes fixing pieces 36 projecting outward, and upper frame 34 and lower frame 35 are fixed to each other by tightening nuts and bolts in screw holes formed in fixing pieces 36. In the example of FIG. 1, fixing pieces 36 are disposed at four positions of up, down, right, and left in the plan view. The screw holes in fixing pieces 36 can be used for fixing power supply device 100. For example, power supply device 100 is screwed to a vehicle using the screw holes.

(Battery Case 20)

Figure 8:
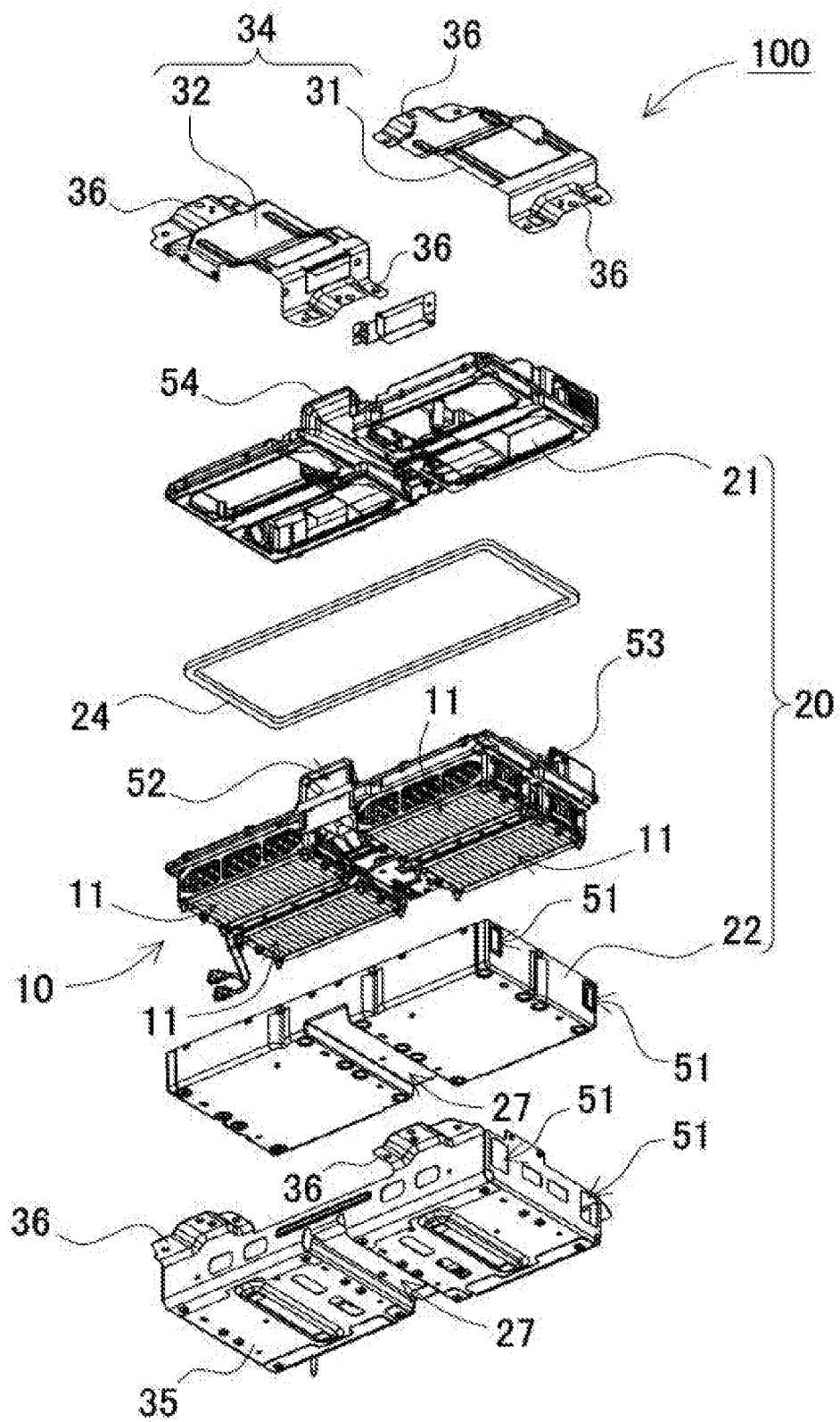
FIG. 8 is an exploded perspective view of the battery case showing the rear side of FIG. 7.

As shown in the exploded perspective views of FIG. 7 and FIG. 8, battery case 20 is divided into two parts; upper case 21 and lower case 22. When battery case 20 is made of a resin, advantageously, even a relatively complicated shape can be easily formed by resin molding. Furthermore, advantageously, a resin is lightweight and inexpensive, and has a high insulation property. Examples of such a resin material include: polypropylene (PP), polybutylene terephthalate (PBT), polyamide/nylon (PA, trademark), or resins of them; a composite material of glass fiber and glass beads; and a carbon fiber resin. Furthermore, in order to improve the immunity to electromagnetic noise, a resin-metal composite material integrally molded by grasping a metal mesh and metal plate with a resin may be employed during resin molding.

An engagement structure is disposed on a joint boundary on which upper case 21 is joined to lower case 22. This structure improves the sealability. Furthermore, by disposing elastic member 24 in the engagement structure, the waterproof property can be further improved. In the example of FIG. 7, packing serving as elastic member 24 is disposed on the joint boundary between upper case 21 and lower case 22. Thus, battery case 20 is protected from water, and secondary battery cells 1 and the electronic circuit in battery case 20 are protected from an unintended short circuit or the like.

Cell stacked bodies 11, circuit board 42, and DC/DC converter 41 are stored in battery case 20. Each cell stacked body 11 is formed by stacking a plurality of secondary battery cells 1 via insulating separators. The opposite end surfaces of each cell stacked body are covered with end plates, and the end plates are fastened to each other via a bond bar. Circuit board 42 is mounted on the electronic circuit such as a protection circuit or a control circuit for controlling the charge and discharge of cell stacked bodies 11.

(DC/DC Converter 41)

DC/DC converter 41 is a member for converting the outputs of cell stacked bodies 11 into a predetermined voltage. For feeding power to electrical components in the vehicle, DC/DC converter 41 converts the outputs of cell stacked bodies 11 into 12V or 24V. By building DC/DC converter 41 into battery case 20 in this manner, the conventional arrangement space for DC/DC converter 41 is not required, and hence the whole space is saved. Here, DC/DC converter 41 has been conventionally disposed as a separate member. A cooling mechanism of cell stacked bodies 11 in battery case 20 can be used also for cooling DC/DC converter 41, as described below. Therefore, the cooling mechanism for the DC/DC converter, which has been conventionally and separately required, can be omitted. Also at this point, the configuration can be simplified and downsized, and the cost can be reduced.

Preferably, DC/DC converter 41 is disposed so as to overlap the region covered with first frame 31 in battery case 20. In the example shown in FIG. 7 and the like, the shape of first frame 31, the internal structure of battery case 20, the size of DC/DC converter 41, the layout are previously designed so that DC/DC converter 41 is located directly under first frame 31. In such a design, DC/DC converter 41 is mechanically protected by first frame 31, and the heat generated by DC/DC converter 41 can be efficiently dissipated out of the power supply device via first frame 31. It is preferable that DC/DC converter 41 is completely stored in the region covered with first frame 31, but the heat dissipation is improved when the heat source of the DC/DC converter is covered with the first frame. Therefore, it is only required that the first frame and the DC/DC converter are disposed so that they overlap each other in the plan view of the battery case, and the DC/DC converter may partially lie off the first frame.

Circuit board 42 is disposed in a region covered with second frame 32. Thus, the heat generated from a circuit group mounted on circuit board 42 can be dissipated via second frame 32. By covering circuit board 42 with metal-made second frame 32, the shielding effect for the electronic circuit mounted in circuit board 42 is also produced, and the immunity to noise is also improved.

In the above-mentioned example, DC/DC converter 41 is disposed on the first frame 31 side, and circuit board 42 is disposed on the second frame 32 side. However, the present invention is not limited to this configuration. For example, the circuit board may be disposed on the first frame side, and the DC/DC converter may be disposed on the second frame side.

(Cooling Structure)

Furthermore, battery case 20 includes a cooling mechanism for dissipating the heat of an internal member. The example of FIG. 7 shows an air-cooling type cooling mechanism that takes a cooling gas from the outside, causes the heat exchange in battery case 20, and exhausts the cooling gas. Specifically, a part of battery case 20 includes intake port 51 for taking a cooling gas into battery case 20 and exhaust port 52 for exhausting the cooling gas after the heat exchange.

Figure 2:
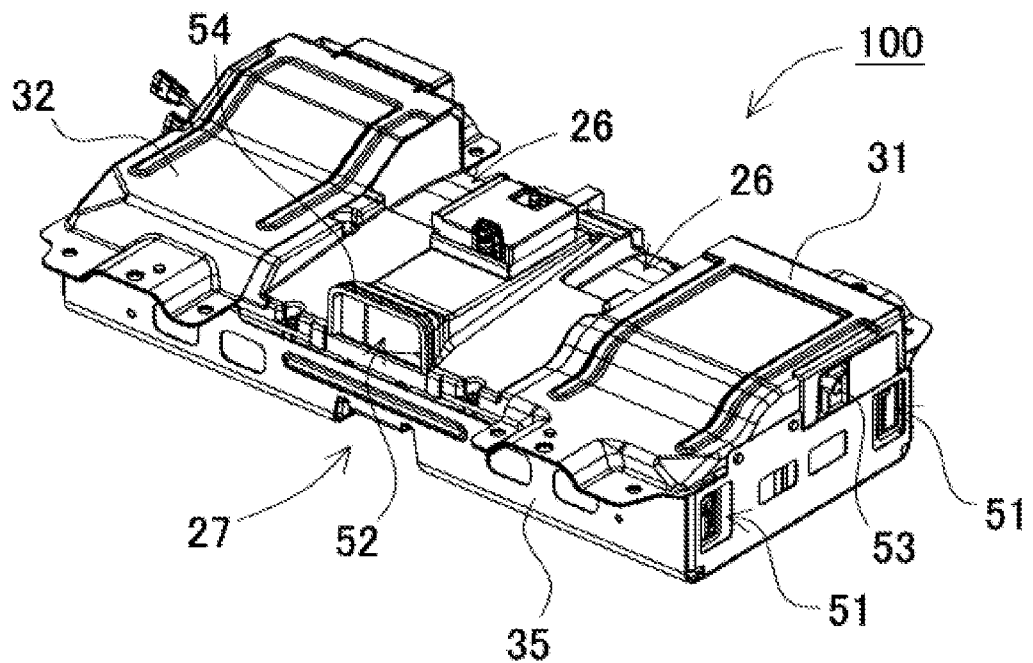
FIG. 2 is a perspective view from the rear side of the power supply device of FIG. 1.
Figure 3:
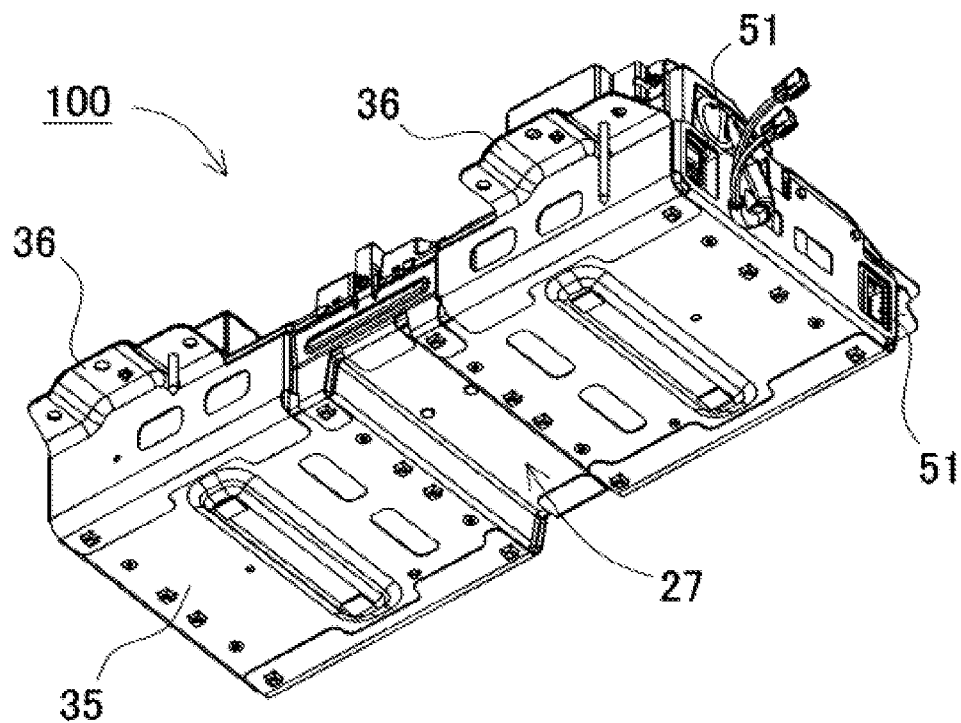
FIG. 3 is a perspective view from the forward-obliquely downward side of the power supply device of FIG. 1.
Figure 4:
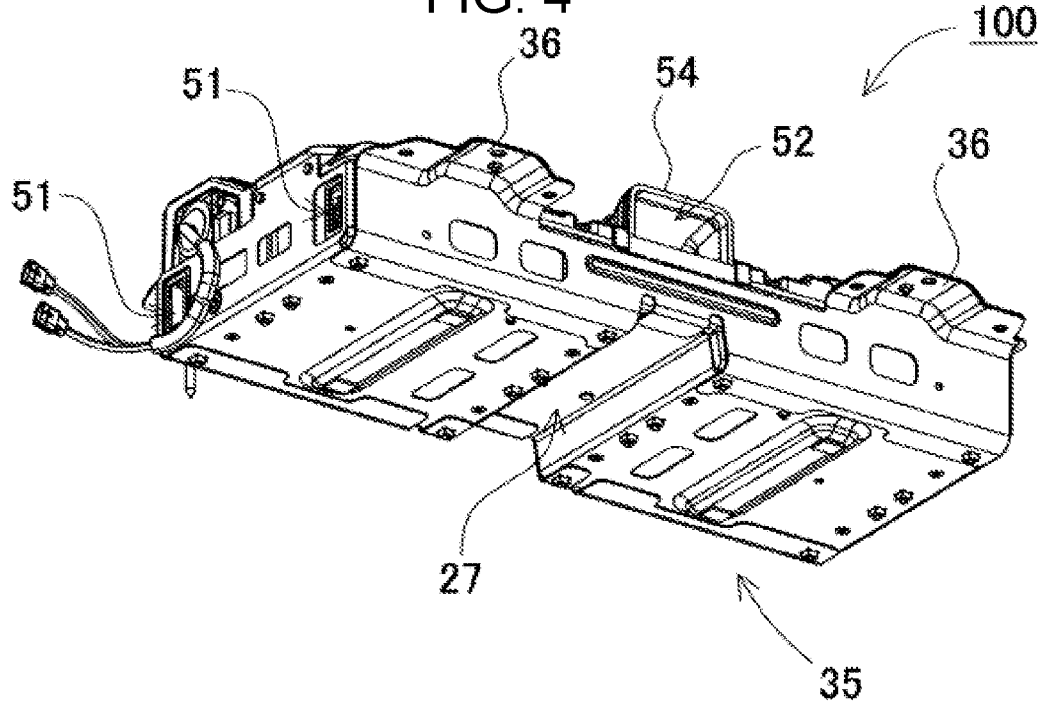
FIG. 4 is a perspective view from the backward-obliquely downward side of the power supply device of FIG. 1.
Figure 5:
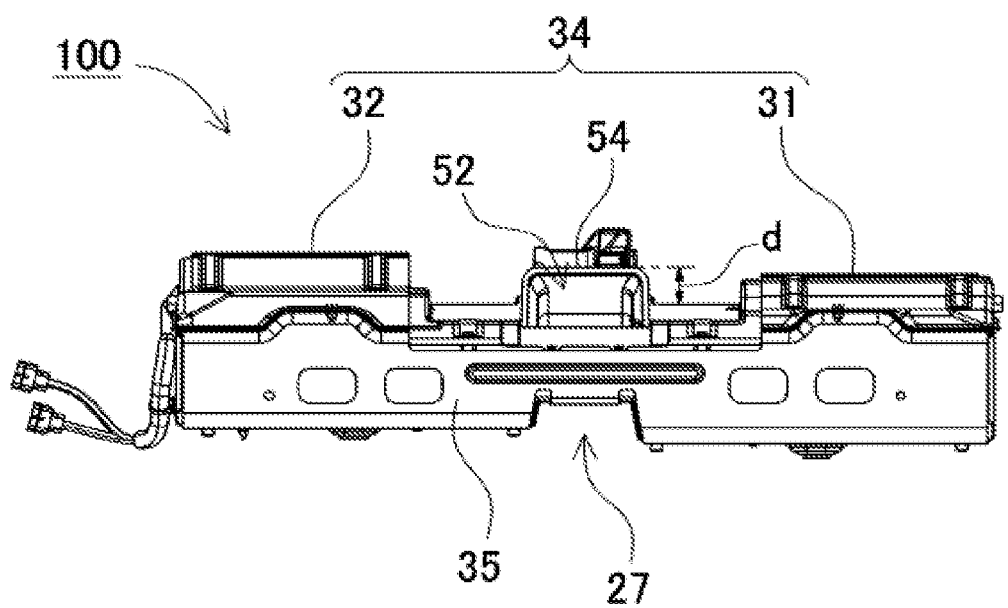
FIG. 5 is a rear view of the power supply device of FIG. 1.

Preferably, at least one of intake port 51 and exhaust port 52 is disposed in exposed region 23. In this configuration, the surface of battery case 20 can be covered with metal frame 30, and a region having opening 54 for air-cooling the inside of battery case 20 can be secured. Opening 54 can be projected from the surface of battery case 20 because opening 54 is not covered with the metal frame. As a result, by increasing the opening surface area of opening 54, the flow rate of the cooling gas can be increased to improve the cooling performance. In the example of FIG. 2, FIG. 5, and the like, opening 54 is opened in the rear surface of battery case 20, and is projected upward by height d from the upper surface of battery case 20. Such opening 54 is molded integrally with upper case 21 of battery case 20. As shown in FIG. 1 and the like, the projection portion is inclined on the upper surface of battery case 20 so as to gradually enlarge toward opening 54.

Thus, in the configuration where first frame 31 and second frame 32 are disposed along the longitudinal direction of battery case 20, by disposing an opening for intake or exhaust in the immediate part in the longitudinal direction, a structure where the route of the cooling gas is branched to the first frame 31 side and the second frame 32 side can be employed. Thus, the cooling gas can be efficiently introduced into or exhausted out of battery case 20.

Figure 11:
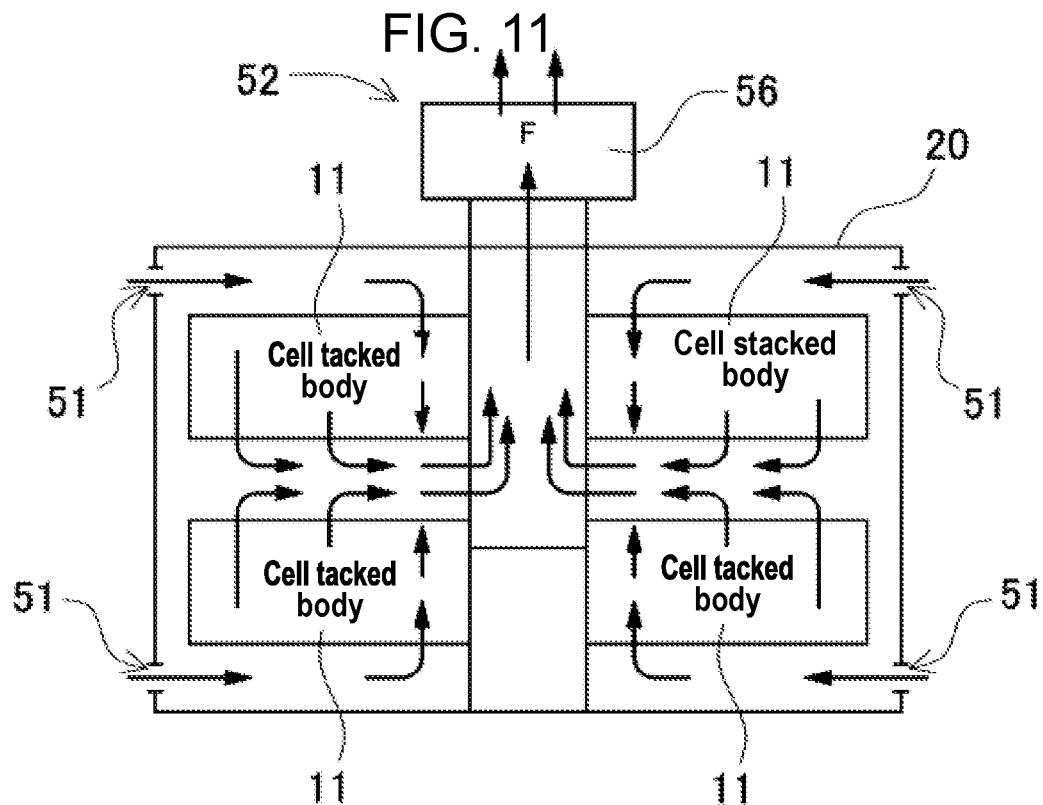
FIG. 11 is a schematic horizontal sectional view showing a route for introducing and exhausting cooling gas from the power supply device.

The other of the intake port and exhaust port is formed on a side surface of battery case 20. In this example, openings formed in the side surfaces of battery case 20 are set as intake ports 51, and an opening formed in the rear surface of exposed region 23 is set as exhaust port 52. Therefore, in lower frame 35, corners corresponding to intake ports 51 are opened. As a result, gas routes through which cooling gas flows into and goes out of battery case 20 are formed as shown in the schematic horizontal sectional view of FIG. 11. In this example, four cell stacked bodies 11 are disposed in battery case 20 at the up, down, right, and left parts in this page. The cooling gas sucked from the up and down parts in right and left side surfaces in FIG. 11 is vertically bent and is passed through cell stacked bodies 11 for heat exchange, and the cooling gas is subsequently guided to the center in the longitudinal direction. The cooling gas gathered through right and left parts to the center is exhausted out of battery case 20 through exhaust port 52 formed in the upward part (rear surface side). In order to guide the cooling gas, a blast duct or the like is appropriately formed in battery case 20. Blast fan 56 is formed near exhaust port 52. Blast fan 56 forcibly exhausts, to the outside through exhaust port 52, the cooling gas taken into battery case 20. In this configuration, especially, a plurality of intake ports 51 are formed and supply the cooling gas to many parts, and exhaust port 52 is shared. Thus, the number of blast fans 56 can be reduced. Especially, just by one blast fan 56, the cooling gas in the plurality of cell stacked bodies 11 can be sucked into and exhausted out of battery case 20.

Figure 12:
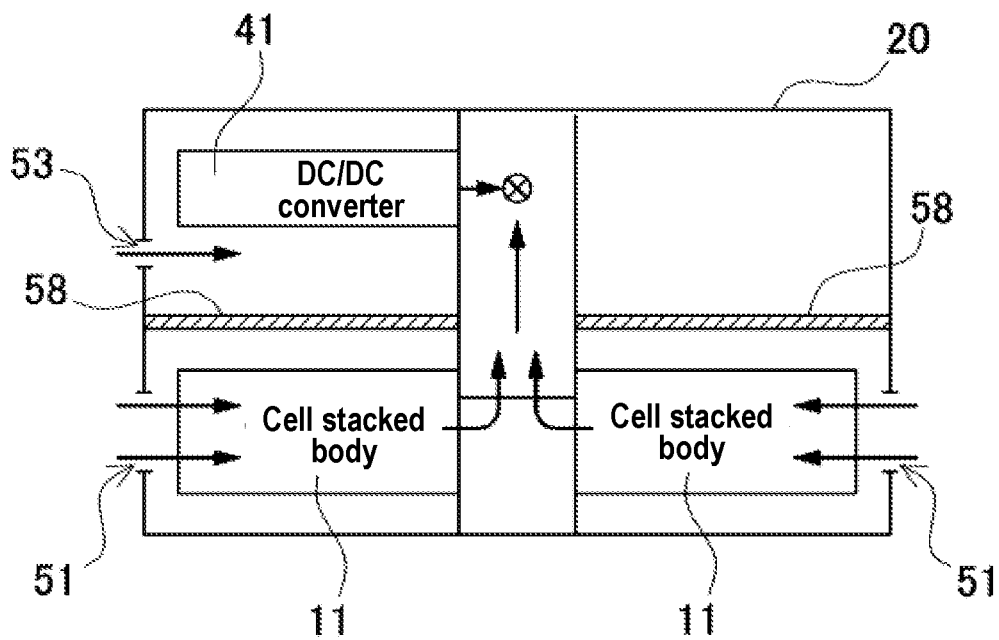
FIG. 12 is a schematic vertical sectional view showing the route for introducing and exhausting cooling gas from the power supply device.

The cooling gas is partially used for cooling another member in battery case 20. Especially, the cooling gas can be used also for cooling the circuits that are mounted in DC/DC converter 41 as the first heat source and in circuit board 42 as the second heat source. In the example shown in FIG. 2, FIG. 8, and the like, intake port 53 for the first heat source is formed in the side surface of battery case 20 and on the disposed side of DC/DC converter 41. Intake port 53 for the first heat source communicates with DC/DC converter 41, the cooling gas can be taken into battery case 20 through intake port 53 for the first heat source, and DC/DC converter 41 can be cooled by heat exchange. The cooling gas after the heat exchange is exhausted out of battery case 20 by blast fans 56. The exhaust route of the cooling gas can be merged with the exhaust route of the cooling gas having cooled cell stacked bodies 11, as discussed above. For this purpose, in battery case 20, a partitioning wall is disposed which separates a cooling gas route for cell stacked bodies 11 from a cooling gas route for DC/DC converter 41. In the example shown by the schematic vertical sectional view of FIG. 12, a vertically partitioning wall 58 is formed which separates the cooling gas route for cell stacked bodies 11 on the downside in battery case 20 from the cooling gas route for DC/DC converter 41 on the upside in battery case 20. In such a configuration, the accidents in which the upside and downside cooling gases before heat exchange mix with each other in battery case 20 can be avoided, and disruption of the balance of the flow rate can be avoided by separating the cooling gas route for cell stacked bodies 11 from that for DC/DC converter 41. In the configuration of FIG. 12, the cooling gas that has cooled cell stacked bodies 11 disposed on the downside in battery case 20 is fed upward through the center part in the longitudinal direction of battery case 20. While, the cooling gas that has cooled DC/DC converter 41 disposed on the upside in battery case 20 is also fed to the center in battery case 20, joins the cooling gas for cell stacked bodies 11 fed from the downside, and is exhausted together through exhaust port 52 disposed on the rear side of FIG. 12. Thus, blast fan 56 for cooling the battery cells can be used also for cooling the heat sources of the circuit or the like, the configuration can be simplified and downsized, and the cost can be reduced. In the example of FIG. 12 and the like, a cooling mechanism of DC/DC converter 41 is disposed, but an intake port for cooling the circuit board side is not disposed. However, an intake port or the like for the second heat source may be disposed as a cooling mechanism for cooling the circuit board.

In the above-mentioned example, openings formed in the side surfaces of battery case 20 are set as intake ports 51, and an opening formed in the rear surface of exposed region 23 is set as exhaust port 52. However, the present invention is not limited to this configuration. For example, openings in the side surfaces of the battery case may be set as exhaust ports, and an opening in the rear surface of the exposed region may be set as an intake port. In this case, the blast fan is disposed on the intake port side, and forcibly feeds the cooling gas to the components.

As the cooling gas, air can be appropriately utilized. The cooling mechanism may be of the air-cooling type that utilizes not only the air but also a refrigerant gas. In the present invention, the means for cooling the power supply device is not limited to an air-cooling type cooling mechanism. Instead of the air-cooling type cooling mechanism or in addition to it, cooling using a refrigerant may be employed or a cooling mechanism using a Peltier element or the like may be employed.

(Recess 25)

Figure 10:
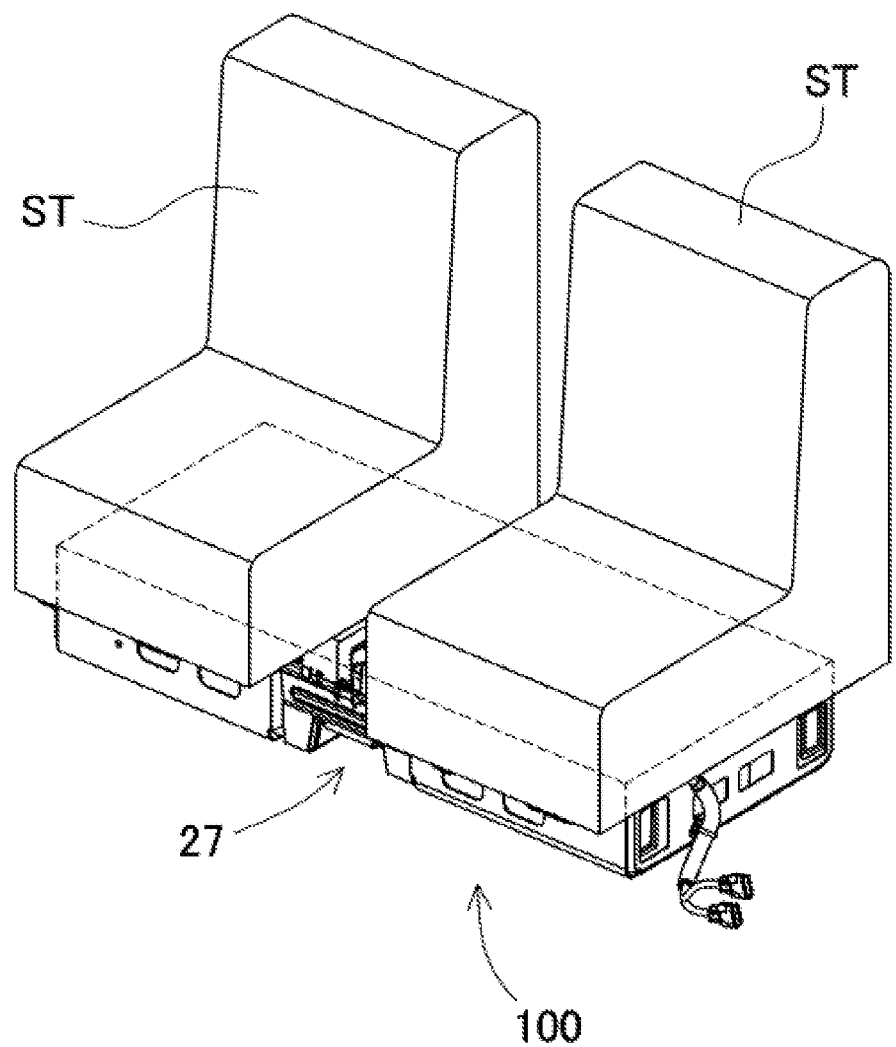
FIG. 10 is a perspective view showing the state where the power supply device is disposed in a vehicle.

Battery case 20 includes one or more recesses 25 in the surface of exposed region 23. Such recesses 25 can be used for positioning or fixing power supply device 100. Recesses 25 include first recesses 26 disposed on the upper surface side of battery case 20 and second recess 27 disposed on the lower surface side of battery case 20. In such a configuration where recesses 25 are disposed on the upper and lower surfaces of battery case 20, the fixing stability and work efficiency can be achieved by positioning battery case 20 from both sides. In the configuration where cell stacked bodies 11 are arranged along the longitudinal direction of battery case 20, by forming recess 25—for example, second recess 27—between cell stacked bodies 11 in the longitudinal direction, a recess can be formed while the arrangement space of cell stacked bodies 11 is secured in battery case 20. As shown in FIG. 10, power supply device 100 is disposed under seats ST in a cabin of the vehicle. Rails of seats ST are disposed in first recesses 26 in the upper surface. Thus, by disposing structurally required first recesses 26 between DC/DC converter 41 and circuit board 42, DC/DC converter 41 is separated and thermally isolated from circuit board 42. By disposing recesses 25 and holding another member in this space, a limited space can be efficiently used.

(Cell Assembly 10)

Figure 9:
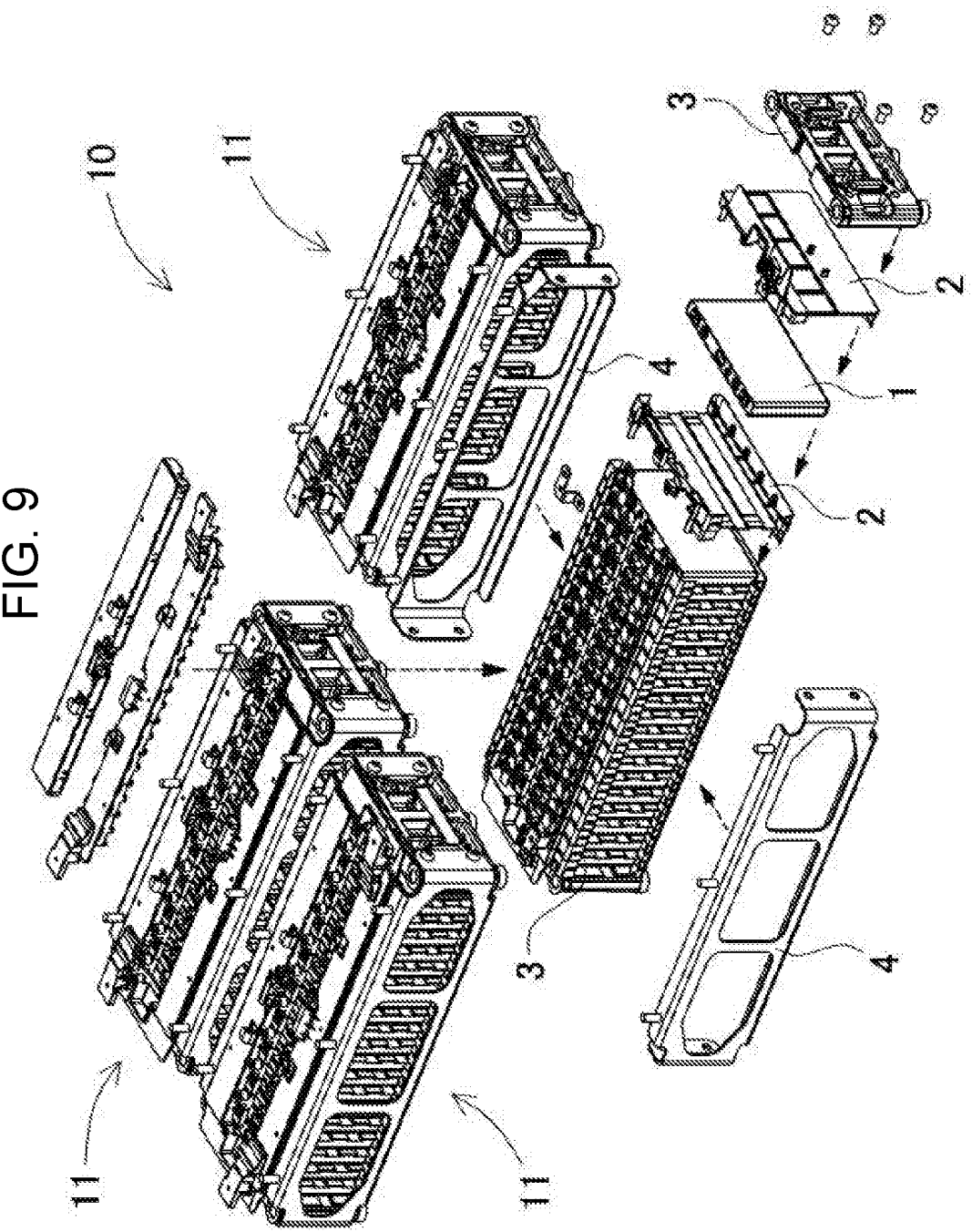
FIG. 9 is an exploded perspective view showing the state where a cell assembly of FIG. 7 is disassembled.

Cell assembly 10 includes cell stacked bodies 11 and circuit board 42. FIG. 9 shows an exploded perspective view of cell assembly 10. In this example, cell assembly 10 includes four cell stacked bodies 11. Two cell stacked bodies 11 are disposed so that their longer surfaces are adjacent to each other, and two sets of them are disposed along the longitudinal direction of battery case 20. The number and layout of the cell stacked bodies are not limited to this example.

Thus, by disposing resin-made battery case 20 in metal frame 30 while keeping a minimum-required structure of metal frame 30 for securing the strength, the balance between the strength and the weight reduction can be kept and a waterproof structure can be also achieved. In other words, battery case 20 is made of a resin, so that a sealed structure is easily obtained and the dust-proof function and waterproof function can be improved. Furthermore, the insulation property on the bottom surface and side surfaces of the power supply device is improved, so that a structure where the surfaces of secondary battery cells 1 are exposed can be employed. Furthermore, the weight of the power supply device can be reduced.

(Cell Stacked Body 11)

Each cell stacked body 11 includes the following components:

a plurality of secondary battery cells 1;

separators 2 that are interposed between main surfaces of the plurality of stacked secondary battery cells 1, and insulate secondary battery cells 1 from each other;

a pair of end plates 3 disposed on end surfaces in the stacking direction in which the plurality of secondary battery cells 1 and separators 2 are alternately stacked; and a plurality of metal-made fastening members 4 that are disposed on the opposite side surfaces of cell stacked body 11, and fasten end plates 3 to each other.

The exterior can of each secondary battery cell 1 is exposed. As discussed above, the insulation property is improved by storing cell stacked bodies 11 in resin-made battery case 20. However, the surface of each secondary battery cell may be coated with an insulating material. For example, the surface of the exterior can other than an electrode portion of the secondary battery cell may be covered by thermally fusing a shrinkable tube made of a polyethylene terephthalate (PET) resin or the like.

(Fastening Member 4)

As shown in FIG. 9, fastening members 4 are disposed on side surfaces of each cell stacked body 11 having end plates 3 at its opposite ends, are fixed to the pair of end plates 3, and fasten cell stacked body 11. Each fastening member 4 is formed in a size large enough to cover substantially the whole side surface of cell stacked body 11. Each fastening member 4 includes openings so as to blow the cooling gas to the gap between secondary battery cells 1. Each fastening member may have another shape. For example, the fastening member may have a shape in which each of the opposite ends of a metal plate extending in a band shape is folded so as to have a channel-shaped cross section. The position at which the fastening member is disposed may be not only on a side surface of cell stacked body 11 but also on the upper surface. The structure for fixing the fastening member to an end plate is not limited to screwing. A known fixing structure such as a rivet, caulking, welding, or bonding may be appropriately used.

(Secondary Battery Cell 1)

Figure 13:
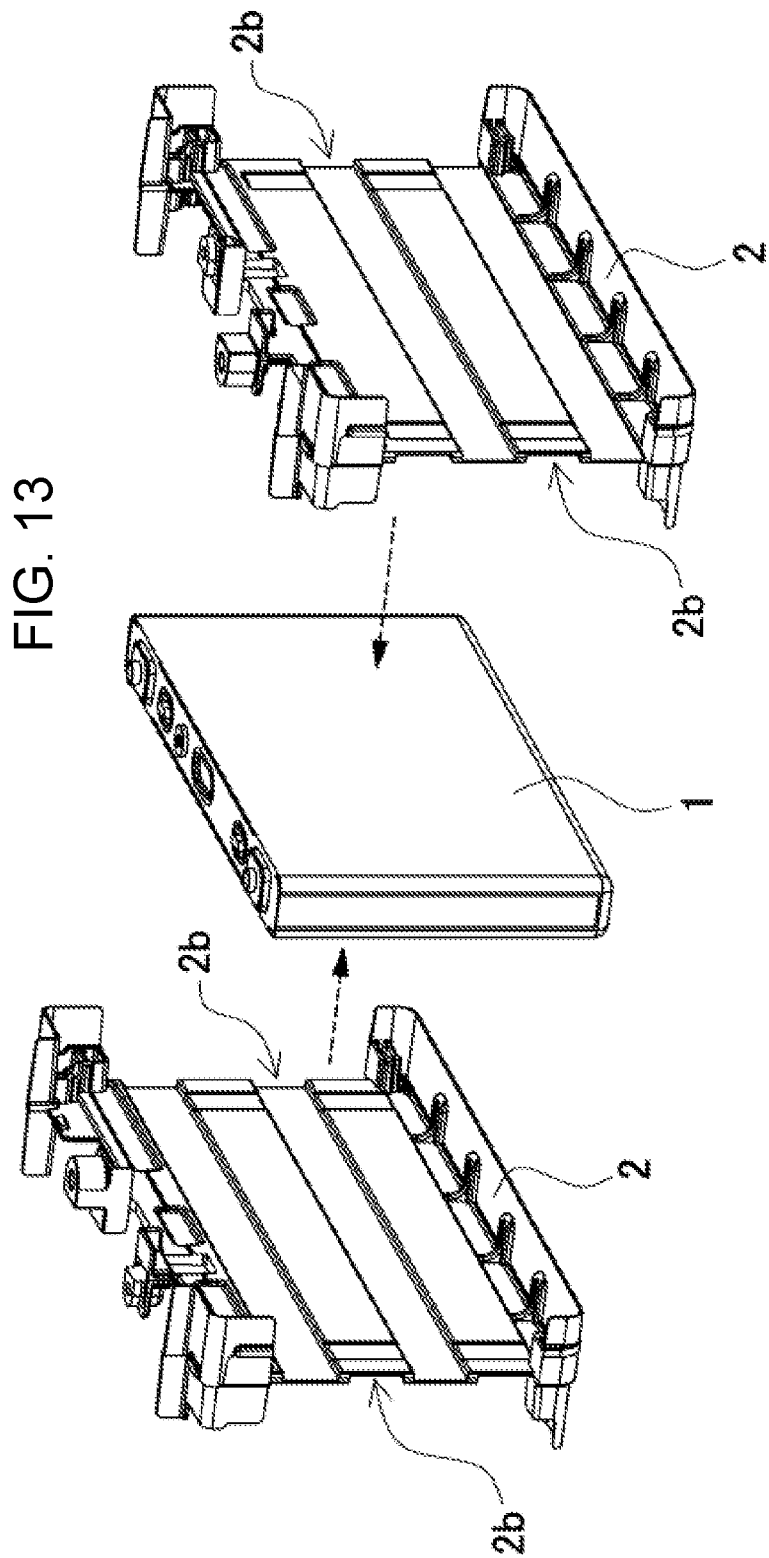
FIG. 13 is an exploded perspective view showing a secondary battery cell and a separator.

As shown in an exploded perspective view of FIG. 13, the exterior can defining the outer shape of each secondary battery cell 1 has a rectangular shape, and its thickness is smaller than its width. The exterior can is formed in a bottomed tubular shape whose upside is open, and the opening is blocked by a sealing plate. An electrode assembly is stored in the exterior can. The sealing plate includes positive and negative electrode terminals, and a gas exhaust valve is disposed between the electrode terminals.

(Separator 2)

As shown in an exploded perspective view of FIG. 13, separator 2 is interposed between opposite main surfaces of adjacent secondary battery cells 1, and insulates them from each other. Separator 2 is formed in a size large enough to cover the whole or the most part of the main surface of secondary battery cell 1. The separator includes, between secondary battery cells 1, cooling clearances through which a cooling gas is passed. Each separator is folded in an uneven shape in the vertical sectional view so as to allow cooling clearances 2b to be formed between the separator and secondary battery cell 1. Thus, cell stacked body 11 is formed by stacking a plurality of secondary battery cells 1 in a state having cooling clearances 2b. The cooling clearances are connected to the cooling mechanism that forcibly feeds the cooling gas such as the air or cold gas and cools secondary battery cells 1. Secondary battery cells 1 are connected to the opposite surfaces of separator 2 in an engagement structure. By using separators 2 connected to secondary battery cells 1 in the engagement structure, adjacent secondary battery cells 1 can be stacked while the positional displacement is inhibited.

The material of the separators has an insulation property. For example, the separators are made of a resin such as plastic, so that the weight and cost can be reduced. The separator may be made of a hard member or flexible member. Especially, a separator having no cooling clearance can be made of a thin flexible material such as a tape-like material. By using a separator that has a tape shape and has an adhesive applied to its one surface, the separator can be easily applied to a region requiring insulation—for example, a part of the main surface or a side surface of secondary battery cell 1. In addition, using a tape shape, the thickness of the separator is easily reduced, and the increase in the thickness and weight of cell stacked body 11 can be suppressed.

In the power supply device having the above-mentioned configuration, the sealability is secured by resin-made battery case 20, the strength is ensured by partially leaving metal frame 30, the strength is kept, the waterproof property is achieved, and the weight is reduced.

The above-mentioned power supply devices can be used as on-vehicle power sources. An example of a vehicle equipped with a power supply device includes an electric vehicle such as a hybrid car or plug-in hybrid car that travels by both an engine and a motor, or such as an electric car that travels only by a motor. The power supply devices are used as power sources for these vehicles.

(Power Supply Device for Hybrid Car)

Figure 14:
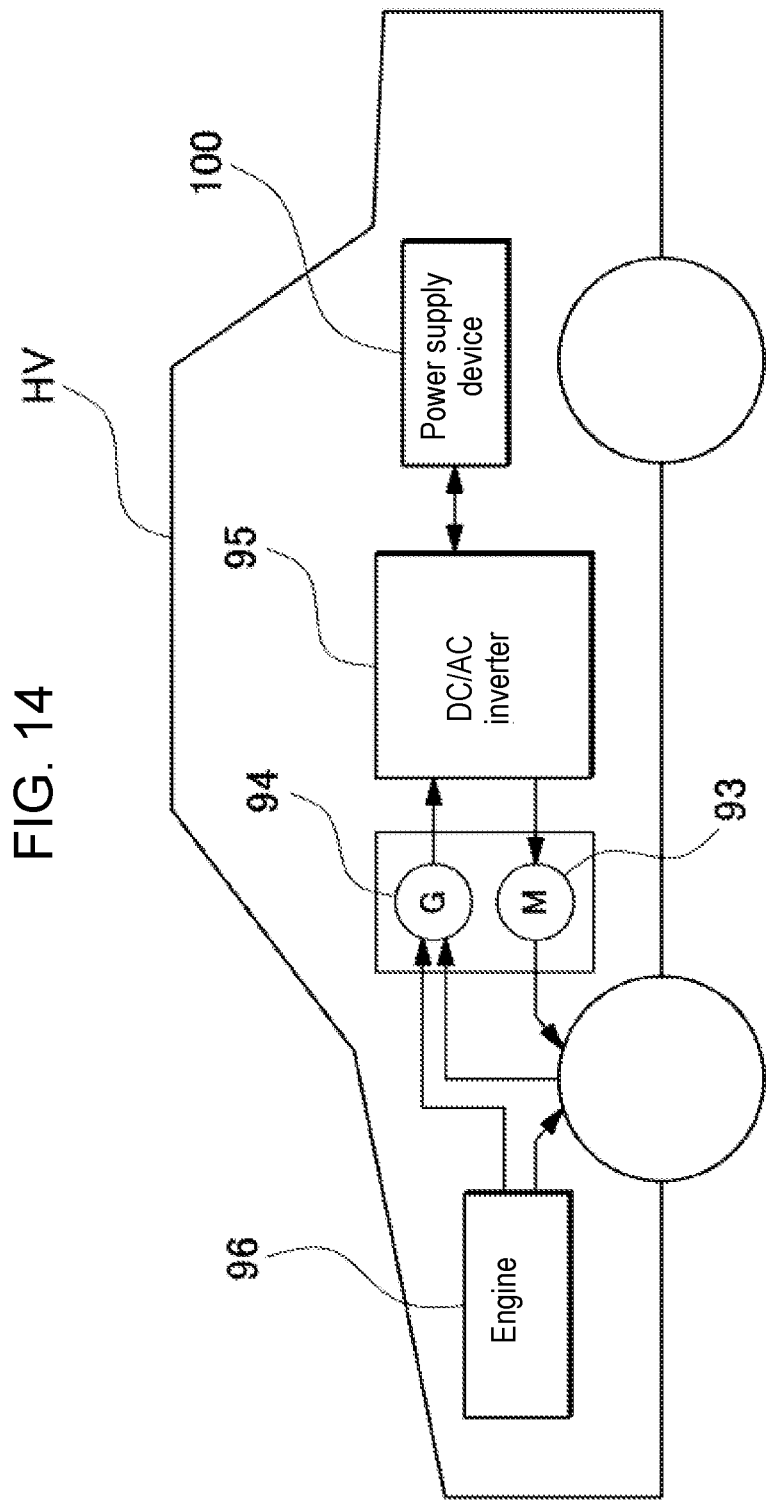
FIG. 14 is a block diagram showing an example in which the power supply device is mounted in a hybrid car traveling by an engine and a motor.

FIG. 14 shows an example in which a power supply device is mounted in a hybrid car that travels by both an engine and a motor. Vehicle HV equipped with a power supply device that is shown in this drawing includes: engine 96 and motor 93 for travel that make vehicle HV travel; power supply device 100 for supplying power to motor 93; and power generator 94 for charging the battery in power supply device 100. Power supply device 100 is connected to motor 93 and power generator 94 via DC/alternating current (AC) inverter 95. Vehicle HV travels by both of motor 93 and engine 96 while charging and discharging the battery of power supply device 100. Motor 93 is driven when the engine efficiency is low, for example during acceleration or low-speed travel, and makes the vehicle travel. Motor 93 receives power from power supply device 100 and is driven. Power generator 94 is driven by engine 96 or is driven by regenerative braking when the vehicle is braked, and charges the battery of power supply device 100.

(Power Supply Device for Electric Car)

Figure 15:
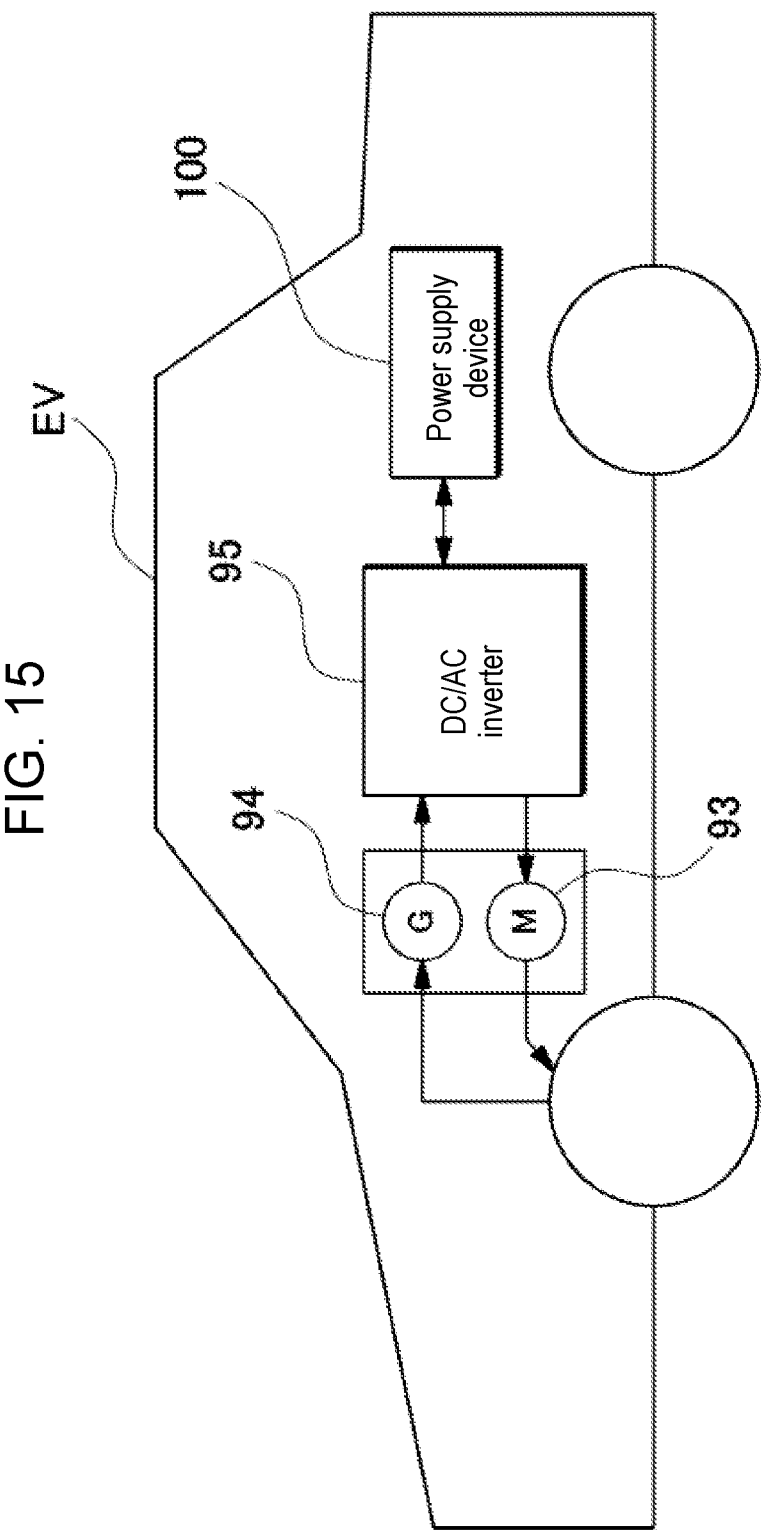
FIG. 15 is a block diagram showing an example in which the power supply device is mounted in an electric car traveling only by a motor.

FIG. 15 shows an example in which a power supply device is mounted in an electric car traveling only by a motor. Vehicle EV equipped with a power supply device that is shown in this drawing includes: motor 93 for travel that makes vehicle EV travel; power supply device 100 for supplying power to motor 93; and power generator 94 for charging the battery in power supply device 100. Motor 93 receives power from power supply device 100 and is driven. Power generator 94 is driven by energy when regenerative braking is applied to vehicle EV, and charges the battery of power supply device 100.

Exemplary embodiments and examples of the present invention have been described with reference to the drawings. The exemplary embodiments and examples show devices for embodying the technical ideas of the present invention. The present invention is not limited to the above-mentioned devices. In the present description, members shown in the scope of claims are not limited to the members of the exemplary embodiments. Especially, the sizes, materials, and shapes of the components, and the relative arrangement between the components, which are described in the exemplary embodiments, do not limit the scope of the present invention but are simply explanation examples as long as there is no specific description. The sizes and the positional relation of the members in each drawing are sometimes exaggerated for clearing the explanation. Furthermore, in the above-mentioned explanation, the same names or the same reference marks denote the same members or same-material members, and detailed description is appropriately omitted. Furthermore, regarding the elements constituting the present invention, a plurality of elements may be formed of the same member, and one member may serve as the plurality of elements. Conversely, the function of one member may be shared by the plurality of members.

INDUSTRIAL APPLICABILITY

A power supply device and a vehicle equipped with the power supply device of the present invention can be suitably used as a power supply device for a plug-in hybrid electric car or hybrid electric car switchable between an electric-vehicle (EV) travel mode and a hybrid-electric-vehicle (HEV) travel mode, or for an electric car. The power supply device can be appropriately used for the following applications: a backup power supply device mountable in a rack of a computer sever; a backup power supply device used for wireless base stations of mobile phones; a power source for storage used at home or in a factory; an electric storage device combined with a solar battery, such as a power source for street lights; and a backup power source for traffic lights.

The invention claimed is:

1. A power supply device which is disposed under seats in a cabin of a vehicle, the power supply device comprising:
   a plurality of cell stacked bodies each formed by stacking secondary battery cells;
   a circuit board including a control circuit electrically connected to the plurality of cell stacked bodies;
   a resin made battery case for storing the plurality of cell stacked bodies and the circuit board;
   a metal-made lower frame for covering a bottom surface of the battery case;
   a metal-made upper frame for covering an upper surface of the battery case; and
   a DC/DC converter for converting an output of one or more of the plurality of cell stacked bodies into a predetermined voltage,
   wherein the battery case has a waterproof structure, and
   wherein the battery case is grasped by connecting the upper frame to the lower frame, wherein
   the upper frame includes a first frame and a second frame, the first frame and the second frame are disposed separately in spaced relationship with each other, and an exposed region is disposed between the first frame and the second frame, the upper surface of the battery case being partially exposed through the exposed region, the plurality of cell stacked bodies are arranged in a longitudinal direction of the battery case, a space is formed between the plurality of cell stacked bodies arranged in the longitudinal direction of the battery case, the exposed region is located above the space, the DC/DC converter is disposed in a region covered with the first frame in the battery case, the circuit board is disposed in a region covered with the second frame in the battery case, one or more recesses are formed in the surface of the battery case in the exposed region, and the one or more recesses include a first recess in which rails of the seats are disposed, the first recess is disposed between the DC/DC converter and the circuit board.

2. The power supply device according to claim 1, wherein an outer shape of the power supply device is set as a rectangular shape extended in one direction in a plan view, and the exposed region is disposed in a center in a longitudinal direction.

3. The power supply device according to claim 1, wherein the battery case includes:
  an intake port for taking a cooling gas into the battery case; and
  an exhaust port for exhausting the cooling gas after heat exchange, and
at least a first port of the intake port and the exhaust port is disposed in the exposed region.

4. The power supply device according to claim 3, wherein an opening projecting from a surface of the battery case is formed in the first port, of the intake port and the exhaust port, disposed in the exposed region.

5. The power supply device according to claim 3, wherein a second port of the intake port and the exhaust port is disposed in a side surface of the battery case.

6. The power supply device according to claim 3, wherein the exhaust port is disposed in the exposed region.

7. The power supply device according to claim 1, wherein each of the lower frame and the upper frame has a fixing piece for fixing the power supply device.

8. The power supply device according to claim 1, wherein the battery case is divided into an upper case and a lower case, and an elastic member is disposed on a joint surface between the upper case and the lower case.

9. The power supply device according to claim 1, wherein the recesses include, in the exposed region of the battery case:
  the first recess disposed on an upper surface side of the battery case; and
  a second recess disposed on a lower surface side of the battery case.

10. The power supply device according to claim 1, wherein the battery case stores the plurality of the cell stacked bodies, the plurality of the cell stacked bodies are arranged in a longitudinal direction of the battery case, and the recesses are formed between the plurality of the cell stacked bodies arranged in the longitudinal direction of the battery case.

11. The power supply device according to claim 1, wherein the lower frame is formed by welding a plurality of metal plates to each other.

12. A vehicle comprising
the power supply device according to claim 1.

13. The power supply device according to claim 1, wherein the upper surface of the battery case is situated in a direction opposite to a direction of gravity so that the upper surface is located above the bottom surface.

14. A power supply device which is disposed under seats in a cabin of a vehicle, the power supply device comprising:
  a plurality of cell stacked bodies each formed by stacking secondary battery cells;
  a circuit board including a control circuit electrically connected to the plurality of cell stacked bodies;
  a resin made battery case for storing the plurality of cell stacked bodies and the circuit board;
  a metal-made lower frame for covering a bottom surface of the battery case;
  a metal-made upper frame for covering an upper surface of the battery case; and
  a DC/DC converter for converting an output of one or more of the plurality of cell stacked bodies into a predetermined voltage, wherein the battery case has a waterproof structure, and wherein the battery case is grasped by connecting the upper frame to the lower frame, wherein the upper frame includes a first frame and a second frame, the first frame and the second frame are disposed separately in spaced relationship with each other, and an exposed region is disposed between the first frame and the second frame, the upper surface of the battery case being partially exposed through the exposed region, wherein the battery case includes:
  an intake port for taking a cooling gas into the battery case; and
  an exhaust port for exhausting the cooling gas after heat exchange, and
at least a first port of the intake port and the exhaust port is disposed in the exposed region, and wherein an opening projecting from a surface of the battery case is formed in the first port, of the intake port and the exhaust port, disposed in the exposed region, the DC/DC converter is disposed in a region covered with the first frame in the battery case, the circuit board is disposed in a region covered with the second frame in the battery case, one or more recesses are formed in the surface of the battery case in the exposed region, and the one or more recesses include a first recess in which rails of the seats are disposed, the first recess is disposed between the DC/DC converter and the circuit board.

* * * * *